United States Patent [19]

Dufner

[11] 4,297,830
[45] Nov. 3, 1981

[54] BEAN HARVESTER

[76] Inventor: Donald E. Dufner, Rte. 1, Box 124, Buxton, N. Dak. 58218

[21] Appl. No.: 124,328

[22] Filed: Feb. 25, 1980

[51] Int. Cl.³ ...................... A01D 45/22; A01D 35/24
[52] U.S. Cl. .......................................... 56/13.6; 56/6; 56/15.9; 56/DIG. 22
[58] Field of Search ............... 56/DIG. 22, 10.6, 13.6, 56/6, 7, 12.1, 234, 235, 11.9, 15.9

[56] References Cited

U.S. PATENT DOCUMENTS

| | | | |
|---|---|---|---|
| 1,864,291 | 6/1932 | Benjamin | 56/13.6 |
| 2,465,405 | 3/1949 | Strawn | 56/12.1 |
| 2,732,675 | 1/1956 | Smith et al. | 56/6 |
| 2,826,032 | 3/1958 | Hayes | 56/12.1 |
| 3,017,732 | 1/1962 | Keyes | 56/11.9 |
| 3,135,079 | 6/1964 | Dunn | 56/13.6 |
| 3,283,486 | 11/1966 | Marek et al. | 56/DIG. 22 |
| 3,646,736 | 3/1972 | Hutchins | 56/DIG. 22 |
| 3,857,225 | 12/1974 | Knudson | 56/13.6 |
| 4,077,189 | 3/1978 | Hering | 56/11.9 |

*Primary Examiner*—Paul J. Hirsch

[57] ABSTRACT

An improved bean harvester comprising a frame attachable to a tractor, the frame having a transverse mounting shaft between the front and rear tractor wheels, and a plurality of cutting blades each pivotally mounted to the shaft and each having a presetting height adjustment and cutting angle adjustment and blade cleaning scraper, each cutter blade being independently hydraulically powered.

10 Claims, 5 Drawing Figures

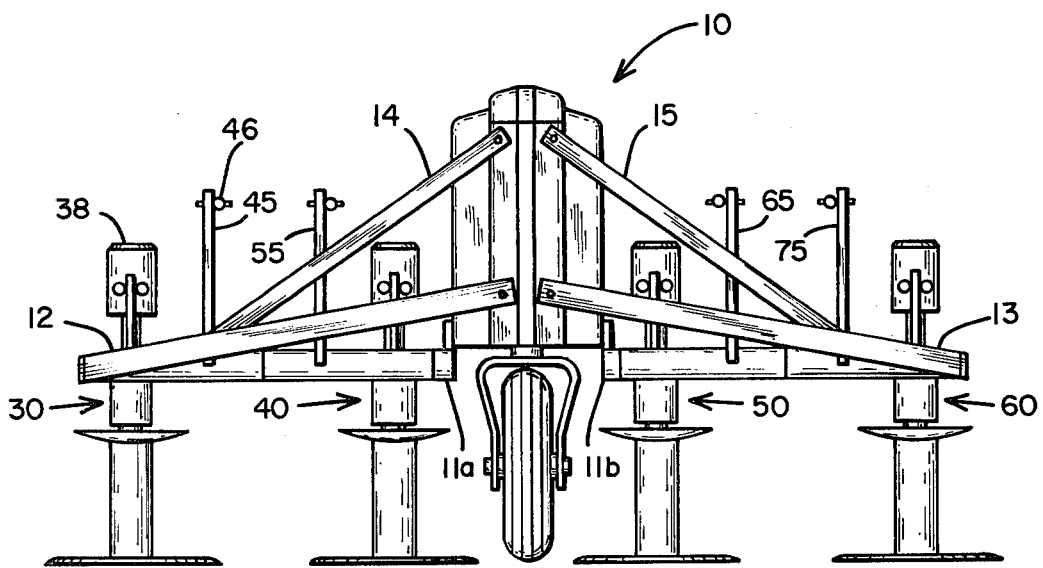
Fig. 3
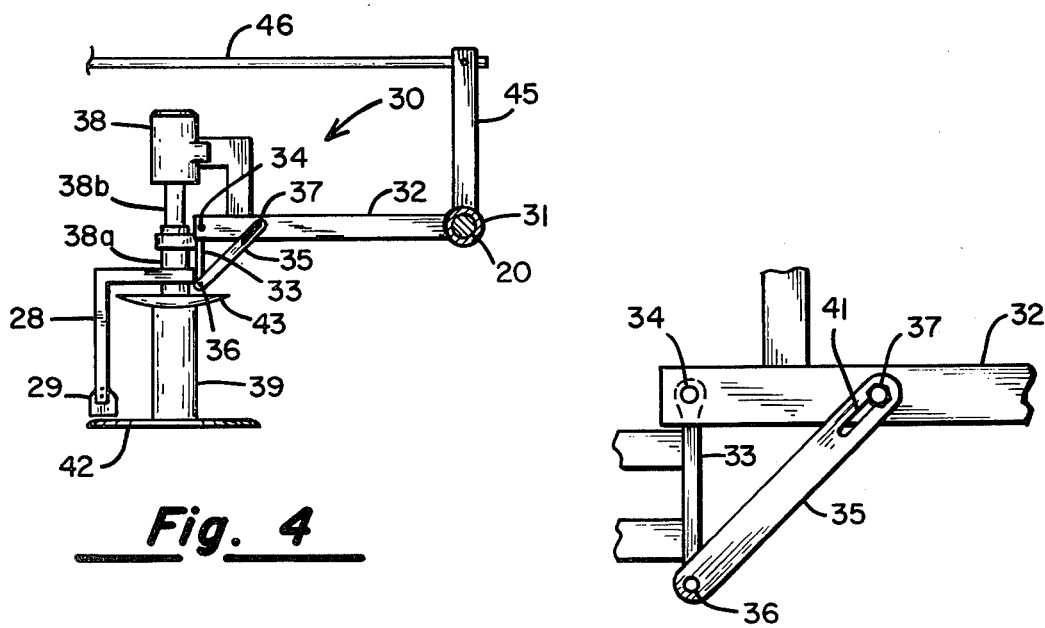
Fig. 4
Fig. 5

BEAN HARVESTER

BACKGROUND OF THE INVENTION

This invention relates to an apparatus for cutting dry edible beans and other agricultural products in the field, and particularly to a device for attachment to a farm tractor. The invention is an improvement over prior art bean cutters such as that described in U.S. Pat. No. 3,857,225, issued Dec. 31, 1974, which discloses a bean cutting device mounted forward of a tractor front wheel on a frame which is supported by additional and auxiliary forward wheels, and for which the various adjusting features relating to the height of the cutting blade and cutting blade angle are accomplished by adjustments made to the entire frame assembly upon which the cutting blades are attached.

In the cutting and thinning of bean plants which are typically planted in parallel rows across a field, it is desirable to work a number of rows at a time with spaced cutting blades. The cutting blades are preferably mounted on a frame assembly which is then carefully steered through the field with the cutting blade set to an optimum subsurface depth which is constantly maintained as the apparatus is propelled across the field. It is desirable that each of the cutting blades follow the general contour of the land as the device moves, and it is further desirable that the apparatus be responsive to small corrections in steering the drive tractor to ensure that proper clearance is maintained between the rows of beans, and that all plants are completely cut by the apparatus.

A particular type of cutting blade has been used for this purpose, having a lower edge for accomplishing the cutting and having a cylindrical drum positioned above the edge for preventing beans from becoming tangled in the cutter, and having an upper edge for deflecting bean plants away from contact with the frame and other portions of the drive mechanism. The cutting blades are powered with a rotating hydraulic drive source to cause them to rotate at a relative constant speed independent of the speed of the tractor.

SUMMARY OF THE INVENTION

Briefly stated, the present invention includes a drawbar shaft which is transversely mounted on a tractor between the front and rear wheels, which drawbar shaft has a plurality of bean cutting units pivotally attached and independently operable. Each of the bean cutting units includes an adjustment means for setting a cutting blade depth, a rotary powered drive source, means for adjusting the cutting angle of the blade, and may include a cleaning scraper for keeping the blade free from accumulated dirt while operating.

It is therefore an object of the present invention to provide an improved bean cutting machine which does not interfere with the steering mechanism of a tractor, and may be more accurately guided by the tractor.

It is another object of the present invention to provide a bean cutter having independently adjustable cutting blades.

It is still a further object of the present invention to provide a bean cutter wherein each cutting blade independently may follow the contour of the land.

BRIEF DESCRIPTION OF THE DRAWINGS

The preferred embodiment of the invention is described herein and with reference to the drawings, in which:

FIG. 3 is a front view of the invention attached to a tractor; and

FIG. 4 is a plan view of a single cutter blade unit; and

FIG. 5 is an expanded view of a portion of FIG. 4.

DESCRIPTION OF THE PREFERRED EMBODIMENT

Figure 1:
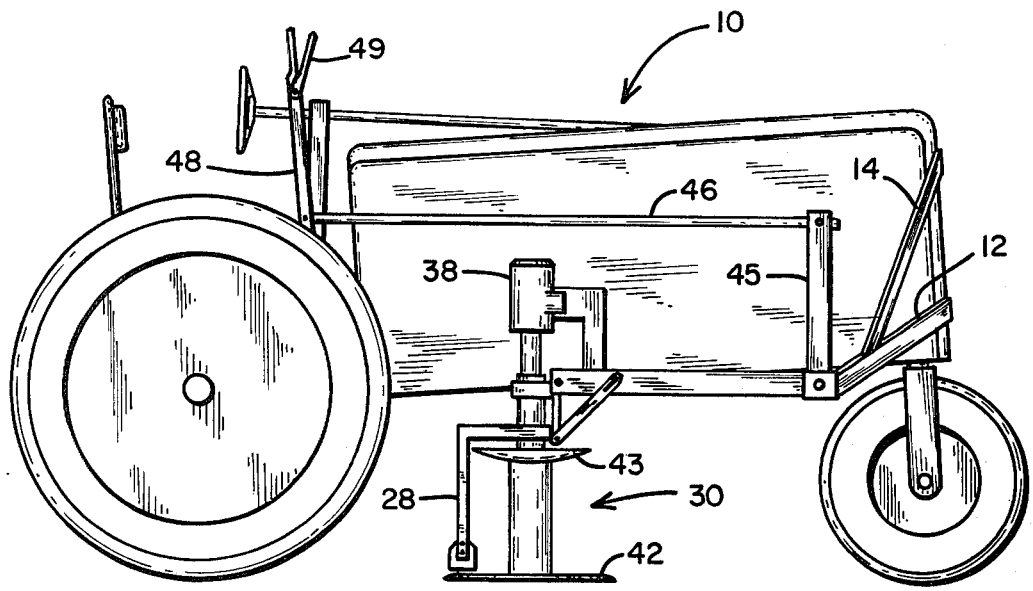
FIG. 1 is a plan view of a tractor showing the invention attached thereto.
Figure 2:
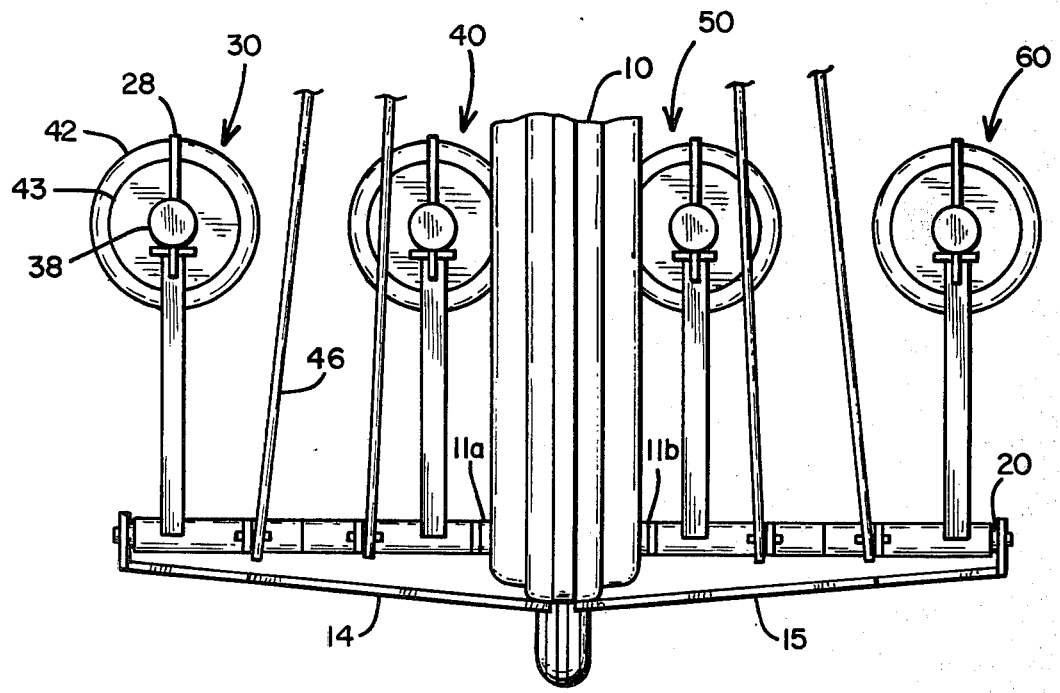
FIG. 2 is a top view of a portion of a tractor and the invention.

Referring first to FIGS. 1–3, there is shown a tractor 10 having a preferred embodiment of the present invention attached thereto. The apparatus is attached to the tractor by means of plates 11a and 11b, frame members 12 and 13, and support members 14 and 15. Frame members 12 and 13 are attached to the ends of a shaft or drawbar 20, which extends transversely and behind the front wheel of the tractor 10. Drawbar 20 passes through sleeve 11, and an additional attachment to tractor 10 may be made by attaching sleeve 11 to the underside of tractor 10.

A plurality of cutter units are attached to drawbar 20. In the preferred embodiment illustrated in the figures there are shown four cutter units, 30, 40, 50, 60, although other equally preferable embodiments could include 6, 8 or even more such cutter units by merely expanding the size of the frame and drawbar assembly.

Since each of the cutter unit assemblies is identical in construction and connection, reference will be made to cutter unit 30 in describing such construction, and with additional reference to FIGS. 4 and 5. Cutter unit 30 is attached to drawbar 20 by means of sleeve 31. Sleeve 31 is loosely fitted over drawbar 20 to provide free rotation thereof about drawbar 20. A bracket 32 is rigidly attached to sleeve 31, extending rearwardly from drawbar 20. A mounting plate 33 is attached to bracket 32 by means of a hinge 34. A bar 35 is attached to mounting plate 33 by means of a second hinge 36, and is further attached to bracket 32 by bolt 37. The upper end of bar 35 may be moved along slot 41 by loosening bolt 37. Movement of the upper end of bar 35 in the forward direction causes mounting plate 33 to become inclined at an acute angle relative to bracket 32; movement of the upper end of bar 35 in the reverse direction causes mounting plate 33 to become inclined at an obtuse angle relative to bracket 32. Hinge pins 34 and 36 permit the angular positioning of mounting plate 33 relative to bracket 32.

Hydraulic motor 38 is attached to mounting plate 33 and bracket 32 by suitable attachments. Hydraulic motor 38 has a bearing housing 38a through which a rotatable drive shaft 38b passes, and cutter unit 39 is attached to this drive shaft. Cutter unit 39 is attached to this drive shaft. Cutter unit 39 has a lower edge 42 which operates as a cutter blade. Edge 42 may be sharpened around its periphery, or it may be serrated and sharpened, depending upon the type of cutting edge desired. Cutter unit 39 has an upper edge 43 which is dish-shaped, and which serves to deflect the crop being cut from entanglement with the other portions of the apparatus.

A scraper blade 29 is held in close proximity to cutting edge 42, and is attached to mounting plate 33 by means of a bracket 28. Scraper blade 29 serves to clean excess soil from the top surface of cutting edge 42.

Sleeve 31 has a control arm 45 rigidly attached thereto, so that pivotal movement of control arm 45 about shaft 20 causes corresponding movement of bracket 32 and cutter unit 30. An elongated rod 46 is attached at one of its ends to control arm 45, and is attached at its other end to lever 48. Lever 48 is latchable in a latching mechanism (not shown) by squeezing handle 49 and positioning lever 48 in one of a plurality of latch positions. In each of these latch positions lever 48 controls the maximum depth which the cutter blade can operate in the ground.

Each of the cutter units 30, 40, 50, 60 respectively has a control arm 45, 55, 65, 75 coupled to a lever to permit independent adjustment of each cutter unit to a relative height position. Similarly, each cutter unit is pivotally attached to a bracket such as bracket 32 for cutter unit 30, to permit independent adjustment of the cutting angle in each case.

In operation, the cutting angles are typically initially adjusted for each cutter unit, and a short operational run is made over a field where cutting is to be accomplished. During this run the units are adjusted for optimal cutting depth in the soil. Depending upon the characteristics and moisture content of the soil, and also upon the condition and wear of the cutting edges, the cutting angle of one or more cutting units may be readjusted for optimal operation. Once this has been accomplished and the device is brought into full operation in cutting a crop on a field, the respective cutting heights may be adjusted while the unit is moving to select the best cutting height for each cutter unit as the soil and speed conditions dictate. Any single cutter unit can be brought out of operation while the other cutter units are still operating, by moving its respective lever to the maximum forward position, which causes the cutter unit to raise and withdraw from the soil.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An apparatus for cutting beans and other crops, for attachment to a tractor comprising
   (a) an elongated drawbar shaft and means for attaching said drawbar shaft in transverse position on a tractor between the front and rear wheels thereof;
   (b) a plurality of sleeve sections rotatably fitted on said drawbar shaft;
   (c) a plurality of brackets respectively attached to each of said sleeve sections and extending rearwardly of said drawbar shaft;
   (d) a plurality of rotatable power drive units, each respectively attached to a bracket and having a downwardly projecting power drive shaft;
   (e) a plurality of spool-shaped cutters, each respectively attached to a power drive shaft and having a lower cutting edge and an upper shield edge; and
   (f) means for rotatably positioning each of said plurality of sleeve sections about said drawbar shaft; thereby raising and lowering each of said plurality of cutters.

2. The apparatus of claim 1, further comprising a plurality of hinge means each hinge respectively attached between a rotatable power drive unit and a bracket for permitting a pivotal movement of said drive unit relative to said bracket.

3. The apparatus of claim 2, further comprising an adjustable arm between each of said hinge means and said respective brackets.

4. The apparatus of claim 3, further comprising an elongated slot in each of said adjustable arms, for adjustment of said adjustable arm.

5. The apparatus of claim 3, further comprising a pivoted connection between said adjustable arm and said hinge means.

6. The apparatus of claim 1, further comprising blade means for cleaning the upper surface of each of said cutters lower cutting edge, said blade means being respectively attached to a bracket.

7. The apparatus of claim 1, wherein said means for rotatably positioning said plurality of sleeve sections further comprises an arm attached to each of said sleeve sections, a connecting rod attached to each of said arms, and a latchable lever coupled to each of said connecting rods.

8. An apparatus for cutting beans and other crops, for attachment to a tractor comprising:
   (a) an elongated drawbar having a circular cross section and having means for attachment to said tractor at a point intermediate the front and rear wheels thereof;
   (b) a plurality of sleeve sections rotatably mounted in adjacent positions on said drawbar;
   (c) a pair of elongated arm members rigidly attached to a sleeve section, said arm members projecting radially outward from said sleeve section in angular separation from each other;
   (d) a mounting plate hinged to the end of one of said arm members;
   (e) a rotatable power drive unit rigidly attached to said mounting plate, said drive unit having a drive shaft extending therefrom;
   (f) a cutter blade attached to said drive shaft, said cutter blade having a dish-shaped upper portion, a cylindrical center portion, and a circular blade lower portion;
   (g) a connecting rod attached to the other of said arm members; and
   (h) a latchable lever attached to said connecting rod, said lever being positionable in a plurality of positions and consequently positioning said other arm member in a plurality of angular positions about said drawbar.

9. The apparatus of claim 8, wherein said rotatable power drive unit further comprises a hydraulic motor.

10. The apparatus of claim 8, wherein said drawbar means for attachment to a tractor further comprises attachment means between said front and rear wheels.

* * * * *